M. T. SELS.
HEN'S NEST.
APPLICATION FILED MAY 11, 1920.

1,371,443.

Patented Mar. 15, 1921.
2 SHEETS—SHEET 1.

Witness
Lynn Latta

Inventor
Martinus T. Sels
By Orwig & Barr
Attorneys

M. T. SELS.
HEN'S NEST.
APPLICATION FILED MAY 11, 1920.

1,371,443.

Patented Mar. 15, 1921.
2 SHEETS—SHEET 2.

Witness
Lynn Latta

Inventor
Martinus T. Sels

By Orwig & Bain Attorneys.

UNITED STATES PATENT OFFICE.

MARTINUS T. SELS, OF KNOXVILLE, IOWA.

HEN'S NEST.

1,371,443. Specification of Letters Patent. Patented Mar. 15, 1921.

Application filed May 11, 1920. Serial No. 380,658.

*To all whom it may concern:*

Be it known that I, MARTINUS T. SELS, a citizen of the United States, and a resident of Knoxville, in the county of Marion and State of Iowa, have invented a new and useful Hen's Nest, of which the following is a specification.

My invention relates to nest boxes for poultry and more particularly to an improvement on my previous Letters Patent No. 1,149,544, dated April 10, 1915, and Letters Patent No. 1,167,786, dated January 11, 1916.

An object of my invention is to provide a hen's nest of simple, durable and inexpensive construction, the parts being so arranged that the nest may be removed, whereby it may readily be cleaned.

Another object is to provide a nest, which comprises a nesting compartment and an egg receiving compartment, the parts being arranged so that the egg will travel from the nesting compartment to the egg receiving compartment, where it will be absolutely safe against destruction by the hen.

Another object is to provide a nest device received within a casing, which is pan-shaped and provided with a soft fabric or hemp material for forming a cushion member to prevent the egg from becoming broken, the nest device including a trough whereby the egg may be conveyed from the nest to the bottom of the casing without becoming broken.

With these and other objects in view, my invention consists in the construction, arrangement and combination of the various parts of the device, whereby the objects contemplated are attained, as hereinafter more fully set forth, pointed out in my claim, and illustrated in the accompanying drawings, in which:

Figure 1:
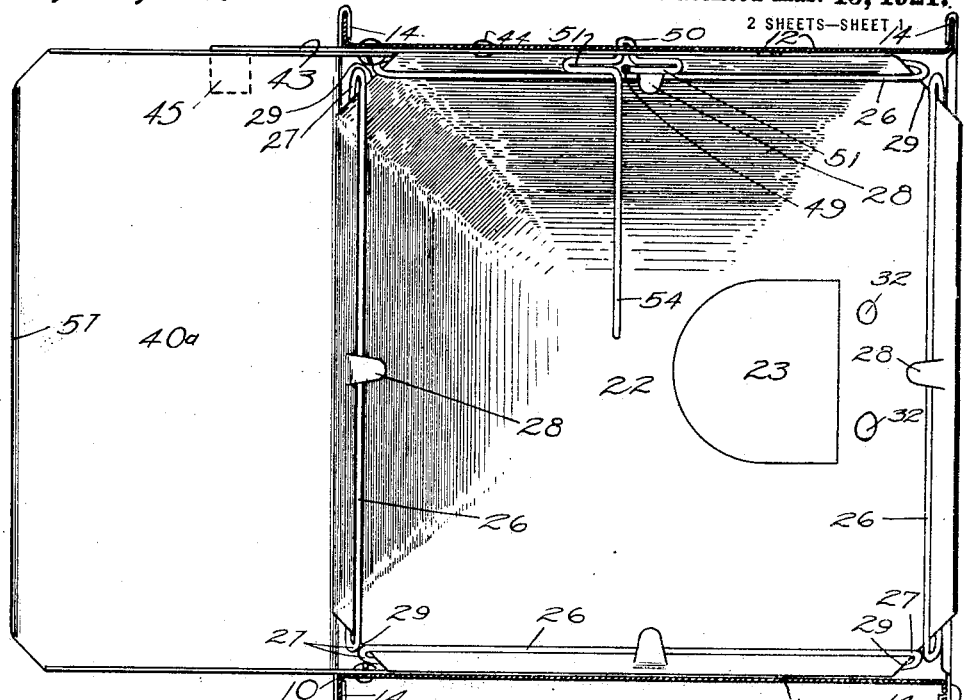
Figure 1 shows a transverse, section view taken on line 1—1 of Fig. 3, the cushion member being omitted from the nest.

In the accompanying drawings, I have used the reference character A to indicate an ordinary casing, which is preferably made of sheet metal.

The casing A comprises a forward wall 10 and rear walls 11 and 11$^a$ and the side walls 12 and 13.

The side walls 12 and 13 are each provided with flanges 14. The forward wall 10 and the rear walls 11 and 11$^a$ are provided with the curved guide portions 15, which receive the flanges 14 of the side walls 12 and 13.

The side walls 12 and 13 are provided at their lower ends with the guides 16 and at their upper ends with the guides 17. A bottom 18 is received in the guides 16 of the side walls 12 and 13, while the top 19 is received within the guides 17 of the side walls 12 and 13.

The bottom 18 is provided at its forward and rear edges with an up-turned flange 20. The top 19 is provided at its forward and rear edges with a down-turned flange 21.

From the foregoing description it will be seen that the casing is formed, so that it may be taken apart readily without the use of any special tools or equipment, or it may be readily and quickly assembled by merely sliding the parts into proper position.

The forward wall 10 and the rear wall 11 of the casing are substantially half the height of the side walls.

Supported within the partition upon the forward wall 10 and the rear wall 11 is the nest device B, which will be more fully described hereafter.

The nest B comprises a pan-shaped member 22, which is provided with an opening 23 in its bottom, substantially back of its center. The pan-shaped member 22 is provided at its forward and rear edges with the down-turned flanges 23 and 24. The portion between the down-turned flanges 23 and 24 and the pan-shaped member 22 form a substantially inverted U-shaped portion in cross section.

The nest device rests upon the upper edges of the forward and rear walls, and is held against lateral movement by means of the flanges 23 and 24 and against sideward movement by the side walls 12 and 13.

In order to provide a cushion effect to the nest device B, I have provided the soft material 25, which may be of hemp or some other soft flexible material.

It is essential that the nest device may be readily cleaned and disinfected. In order to make the cushion member 25 readily removable from the nest, I have provided the wire 26 to which the soft material 25 is sewed. The ends of the wire 26 are bent at 27 into a substantially U-shaped portion.

Figure 6:
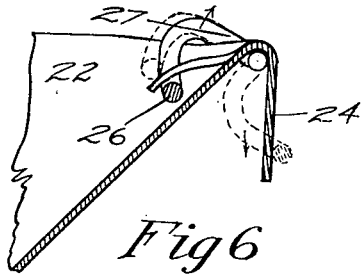
Fig. 6 shows a detail, sectional view of the method of holding the cushion device in the nest.

Stamped inwardly on the pan-shaped member 22 are the lugs 28. The corners of the pan-shaped member are beveled at 29. In order to install the wire 26, which has fastened to it, the cushion member 25, the two ends of the bent portion 27 are placed against the beveled portions 29 and by springing the center of the wire 26 downwardly until it is lower than the lower edge of the lug 28, the wire 26 will then be permitted to spring back to its original position, the center of the wire 26 resting below the lug 28, and the two ends of the wire being received between the down-turned flange and the body portion of the member 22, substantially as shown in Fig. 6 of the drawings.

From the foregoing description, it will be seen that the cushion member 25 for the nest device is practically made up of four parts, which are interchangeable and may readily be removed from the nest for cleaning or installing a new one.

When it is desired to remove the entire nest device B from the casing, the back 11ª is removed from the casing, then the nest device is raised upwardly until the flanges 23 and 24 are clear above the upper edges of the forward and rear walls, then the nest may be withdrawn from the casing.

Below the opening 23 within the member 22 is the trough 30, which has a lining of fabric or other soft material 31. The trough 30 is riveted to the member 22 by means of the rivets 32.

Figure 2:
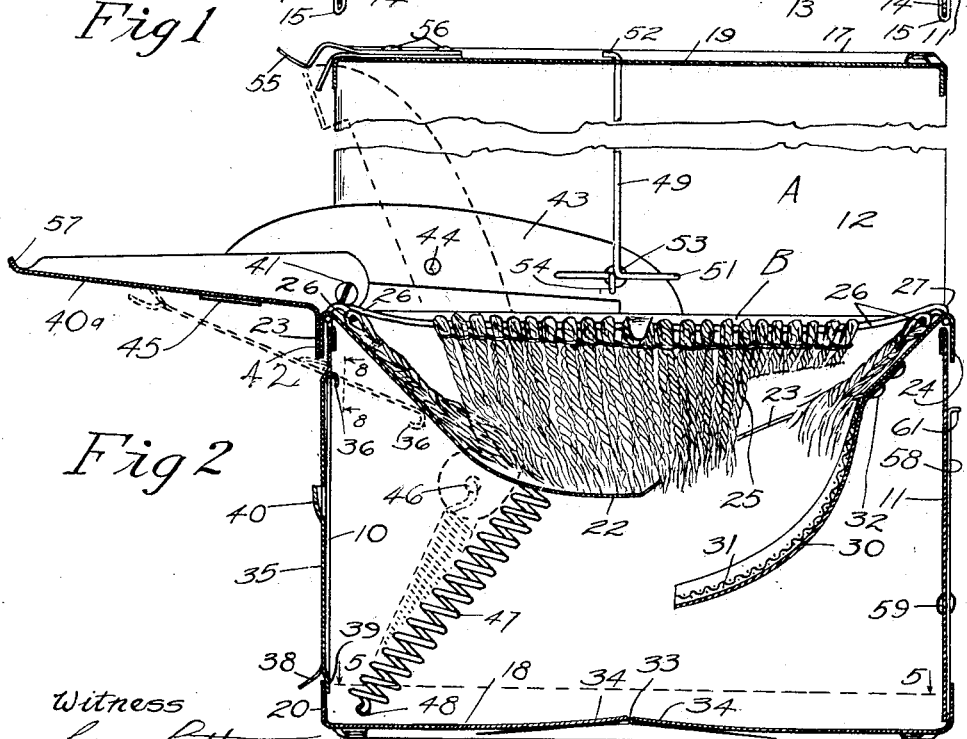
Fig. 2 shows a vertical, central, sectional view taken on the line 2—2 of Fig. 3.
Figure 3:
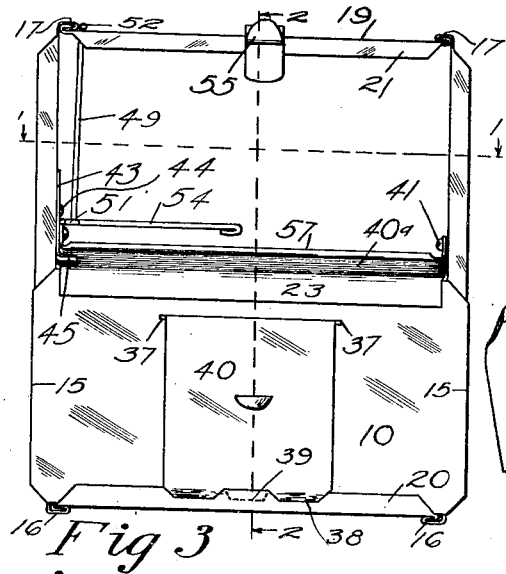
Fig. 3 shows a front elevation of my device.
Figure 4:
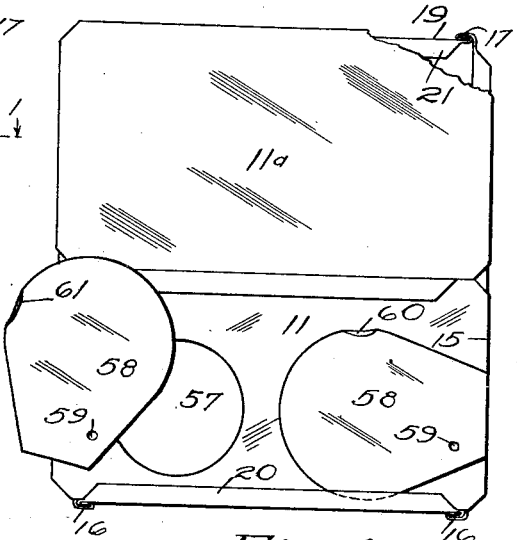
Fig. 4 shows a rear elevation of the same.
Figure 5:
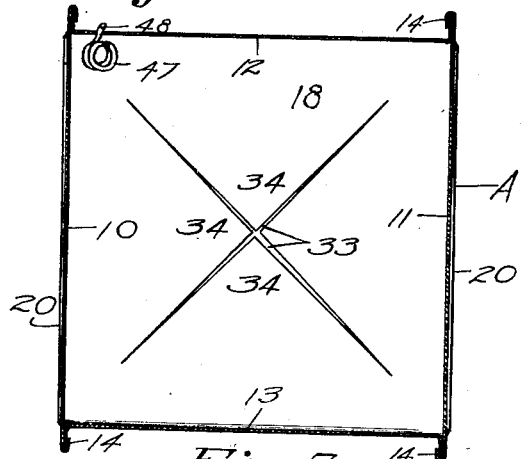
Fig. 5 shows a central, sectional view taken on the line 5—5 of Fig. 2, showing the resilient fingers on the bottom of the casing for cushioning the egg against breaking when it drops from the nest device.

The bottom 18 of the casing is provided with diagonal slits 33, whereby the fingers 34 are formed. The fingers 34 are raised slightly upwardly toward the center, as is shown in Fig. 2 of the drawings.

When an egg is laid, the hen moving around will cause the egg to pass through the opening 23 and onto the trough 30. The egg then rolls off of the trough 30 onto the resilient fingers 34, the resilient fingers forming a cushion effect when the egg is dropped off of the end of the trough 30 and prevents it from becoming broken.

As soon as the egg is received into the portion of the casing below the nest, which may be called an egg receiving compartment, it is then safe against destruction by the hen, the trough 30 preventing the hen from placing her head through the opening 23 and coming in contact with the egg.

The resilient fingers, which are curved upwardly toward their center, cause the egg to roll to one side of the bottom 18, so that when the next egg passes down the trough 30, it will strike the fingers 34 and then roll over to a side, without directly striking the eggs, which are already within the egg receiving compartment.

In order to gather the eggs from within the egg receiving compartment, I have provided a door 35, which has its upper edge bent at 36. The forward wall of the casing is provided with a slot 37, which is slightly longer than the opening within the wall 10.

The curved portion 36 of the door 35 is partially received within the slot 37, thus forming a hinge, whereby the door may be swung to open position.

The lower edge of the door is provided with a forwardly extending flange 38 and a rearwardly extending flange 39. The forwardly extending flange 38 forms a handle, whereby the door 35 may be grasped. The flange 39 is received back of the flange 20, which is formed on the bottom 18, thus forming a lock against the accidental opening of the door 35.

In order to open the door 35, the flange 38 is grasped and the door member is moved directly upwardly. There is enough resiliency in the forward wall 10, so that the portion above the slot 37 will give enough, so that the door may first be raised directly upwardly until the flange 39 disengages from the up-turned flange 20. As soon as the flanges disengage, then the door 35 may be swung to the position shown in dotted lines in Fig. 2 of the drawings.

A stamped portion 40 is formed on the forward side of the door 35, which acts as a stop device when the door is moved to open position, the portion 40 resting against the wall 10.

A closure 40ª is provided, which serves as a platform or rest, whereby the hen may enter the nest.

I have provided suitable means for operating the closure member 40ª for causing it to be moved to closed position, when I desire to trap the hen within the nest.

In order to operate the closure member 40ª, I use the following means:

The closure member 40ª is hinged to the side walls 12 and 13 by means of the screws 41. The lower edge of the closure member 40ª is provided with a downwardly extending flange 42, which rests against the flange 23 of the nest, when the closure member is in its open position. Pivoted to the side wall 12 is the lever 43, which is pivoted at 44. The lever 43 extends out beyond the edge of the side wall and is provided with the flange 45, which rests below the closure member 40ª and acts as a support for holding it in position.

The inner end of the lever 43 is provided with an opening 46, shown in dotted lines in Fig. 1 of the drawings, to which is secured the coil spring 47. The free end of the coil spring 47 is fixed to the side wall 12 at 48.

It will be seen that the spring will tend to draw the lever 43 to the position shown in dotted lines in Fig. 1 of the drawings, and in order to lock the lever in the position shown in solid lines in the drawings, I have provided the latch device 49, which is formed preferably of a wire, which is provided with the curved portions 50 and 51.

The upper end of the latch device 49 is extended through the top 19 at 52 of the casing.

The lever 43 is provided with an opening 53. The side wall 12 is provided with a corresponding opening. The opening 53 and the opening in the side wall 12 register with each other when the lever is in the position shown in solid lines in Fig. 1 of the drawings.

The curved portion 50 of the latch device 49 is extended through the registering openings, whereby the lever will be held against the movement caused by the spring 47. The latch device is provided with a wire 54, which extends substantially toward the center of the nest device.

When the hen enters the nest, it strikes the wire 54 and tends to move it until the curved portion 50 passes out of the registering openings. The action of the spring 47 will then cause the closure member 40ª to move to closed position.

Figure 7:
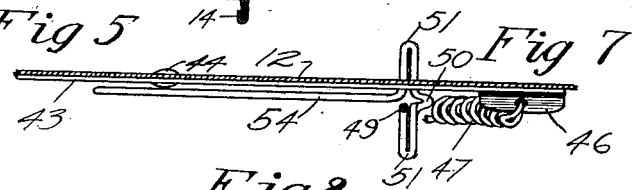
Fig. 7 shows a detailed, sectional view of the latch device when in inoperative position.
Figure 8:
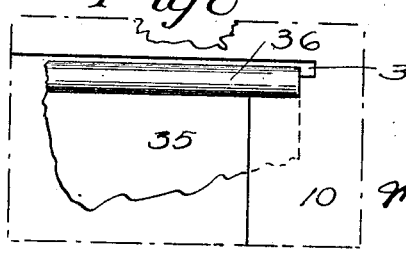
Fig. 8 shows a detailed, sectional view taken on the line 8—8 of Fig. 2.

When it is desired not to use the device as a trap nest, the end 51 is extended through the registering openings instead of the end 50. This is done by turning the latch device one quarter of a turn until the member 54 is substantially parallel with the wall member 12, as is shown in Fig. 7 of the drawings.

It will be seen that it is very easy to change the latch device 49, so that the nest may be used as a trap nest, or it may be moved to position where it will not be operated by the hen, thus using my device as an ordinary nest.

A resilient clip device 55 is riveted to the top 19 by means of the rivets 56.

When the closure member 40ª is caused to be moved to closed position by the spring 47, the curved edge 57 is received in the spring member 55, thus causing the closure member to become locked against accidental movement, and thus locking it in order to prevent the hen from pushing the closure member open.

In the rear wall 11 of the casing, I have provided openings 57 and pivoted closure members 58, which are pivoted to the casing by means of the rivets 59.

The upper end of the closure member 58 is bent forwardly at 60 in order to form the handle member 61.

The flange 20 of the bottom 18 is slightly spaced from the wall 11, so that the lower edge of the closure member 58 may be received between the wall 11 and the flange 20.

The openings 57 are provided when it is desired to use the casing as a setting nest.

When it is desired to use the casing as a setting nest, the device B is removed from the casing A and the door 40ª is swung to closed position. It will then be seen that there is provided a complete casing in which a hen may sit undisturbed without any danger of rats injuring the eggs.

The spring clip 55 is so designed that the door will be slightly spaced away from the upper edge of the casing, in order to permit air to circulate into the casing.

The closure members 58 may also be slightly open for permitting air to circulate.

Small chicks may pass out through the opening 57, but the hen can not pass out through that opening, and the casing could be used for several days, after the small chicks are hatched.

One of the advantages of my device is that it is very simple to operate or fix to be used for various purposes by the poultrymen without any additional expense on their part.

The device, being so adapted, that it may be thoroughly cleaned and disinfected with the least amount of labor possible.

Some changes may be made in the construction and arrangement of the various parts of my device, without departing from the essential features and purposes of my invention, and it is my intention to cover by my claim, any modified forms of structure or use of mechanical equivalents, which may be reasonably included within their scope.

I claim as my invention:

A nest box comprising a casing having a nest device removably supported therein intermediate of its top and bottom, the portion above the nest device forming a laying compartment and the portion below forming an egg receiving compartment, said nest device including a pan member having its sides tapered toward the center, hook members formed on the pan member, flexible material members fixed to a wire member capable of being sprung to position where its ends may be received over the edges of the pan member and its center below said hook member, whereby a soft nest device will be formed, the pan member having an opening in its bottom rearwardly of its center, a trough fixed to said pan member below said opening for conveying the eggs into egg receiving compartment without their breaking, the casing being formed with openings whereby access may be had into the laying compartment and also into the egg receiving compartment for removing the eggs.

Des Moines, Iowa, April 28, 1920.

MARTINUS T. SELS.